(12) United States Patent
Kamiya et al.

(10) Patent No.: US 8,950,248 B2
(45) Date of Patent: Feb. 10, 2015

(54) AIR FLOW MEASURING DEVICE HAVING A SENSOR ACCOMMODATED IN A BYPASS FLOW PASSAGE

(75) Inventors: Shinichi Kamiya, Kariya (JP); Noboru Kitahara, Kariya (JP)

(73) Assignee: Denso Corporation, Kariya (JP)

( * ) Notice: Subject to any disclaimer, the term of this patent is extended or adjusted under 35 U.S.C. 154(b) by 179 days.

(21) Appl. No.: 13/547,336

(22) Filed: Jul. 12, 2012

(65) Prior Publication Data

US 2013/0014573 A1 Jan. 17, 2013

(30) Foreign Application Priority Data

Jul. 16, 2011 (JP) ................................. 2011-157256

(51) Int. Cl.
| | | |
|---|---|---|
| G01M 15/02 | (2006.01) | |
| G01F 1/684 | (2006.01) | |
| G01F 1/72 | (2006.01) | |
| G01F 5/00 | (2006.01) | |
| G01F 15/12 | (2006.01) | |
| F02D 41/18 | (2006.01) | |

(52) U.S. Cl.
CPC ................. *G01F 1/6842* (2013.01); *G01F 1/72* (2013.01); *G01F 5/00* (2013.01); *G01F 15/12* (2013.01); *F02D 41/18* (2013.01); *F02D 41/187* (2013.01)
USPC ....................................................... 73/114.32

(58) Field of Classification Search
USPC ............... 73/114.31, 114.32, 114.33, 114.34, 73/114.37, 202, 202.5
See application file for complete search history.

(56) References Cited

U.S. PATENT DOCUMENTS

| | | | | |
|---|---|---|---|---|
| 5,563,340 A | * | 10/1996 | Clowater et al. ............. | 73/202.5 |
| 5,804,718 A | | 9/1998 | Nagasaka et al. | |
| 6,332,356 B1 | | 12/2001 | Hecht et al. | |
| 6,557,408 B1 | * | 5/2003 | Mueller et al. ............... | 73/202.5 |
| 7,305,877 B2 | * | 12/2007 | Beyrich et al. ............... | 73/202.5 |
| 8,656,764 B2 | * | 2/2014 | Kitahara .................... | 73/114.32 |
| 2003/0046996 A1 | | 3/2003 | Nakada et al. | |

(Continued)

FOREIGN PATENT DOCUMENTS

JP 2011-112569 6/2011

OTHER PUBLICATIONS

Office Action (1 page) dated Jul. 9, 2013, issued in corresponding Japanese Application No. 2011-157256 and English translation (2 pages).

(Continued)

*Primary Examiner* — Eric S McCall
(74) *Attorney, Agent, or Firm* — Nixon & Vanderhye P.C.

(57) ABSTRACT

An air flow measuring device takes in part of intake air flowing through an intake passage. The device includes a housing and a sensor. The housing defines a bypass flow passage through which taken-in intake air passes and which has an outlet that opens on an outer wall of the housing. The sensor is accommodated in the bypass passage to produce an electrical signal as a result of heat transfer between taken-in intake air and the sensor. The outlet of the bypass passage includes vertical and non-vertical openings. The vertical opening opens toward a downstream side of a flow of intake air in the intake passage and is provided perpendicular to the flow of intake air. The non-vertical opening is provided non-perpendicularly to the flow of intake air in the intake passage. The outlet is a continuous stretch of opening where the vertical and non-vertical openings are continuously formed.

3 Claims, 3 Drawing Sheets

(56) References Cited

U.S. PATENT DOCUMENTS

| | | | |
|---|---|---|---|
| 2006/0016254 A1* | 1/2006 | Okuda et al. | 73/118.2 |
| 2007/0062275 A1* | 3/2007 | Beyrich et al. | 73/204.21 |
| 2007/0062276 A1* | 3/2007 | Konzelmann et al. | 73/204.21 |
| 2011/0000289 A1* | 1/2011 | Konzelmann et al. | 73/114.34 |
| 2012/0048005 A1* | 3/2012 | Renninger et al. | 73/114.32 |
| 2012/0240668 A1* | 9/2012 | Goka et al. | 73/114.32 |
| 2012/0324990 A1* | 12/2012 | Briese | 73/114.35 |
| 2013/0014572 A1* | 1/2013 | Kitahara | 73/114.32 |
| 2013/0019675 A1* | 1/2013 | Ban et al. | 73/202 |

OTHER PUBLICATIONS

Office Action (1 page) dated May 7, 2013, issued in corresponding Japanese Application No. 2011-157256 and English translation (2 pages).

* cited by examiner

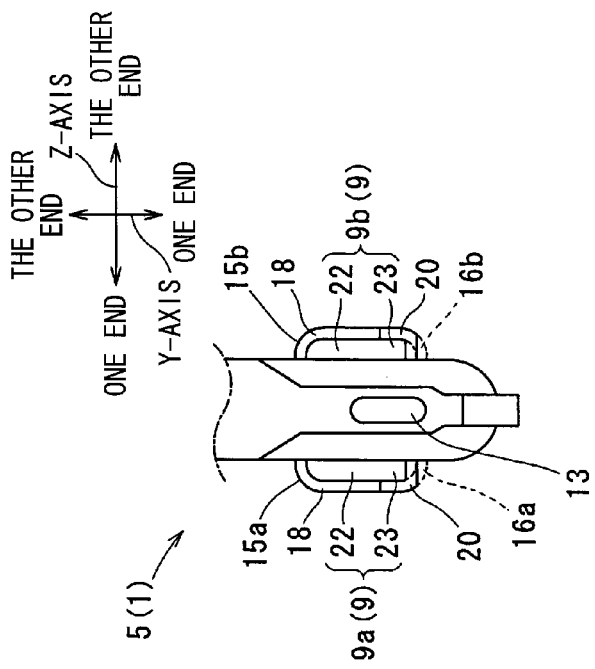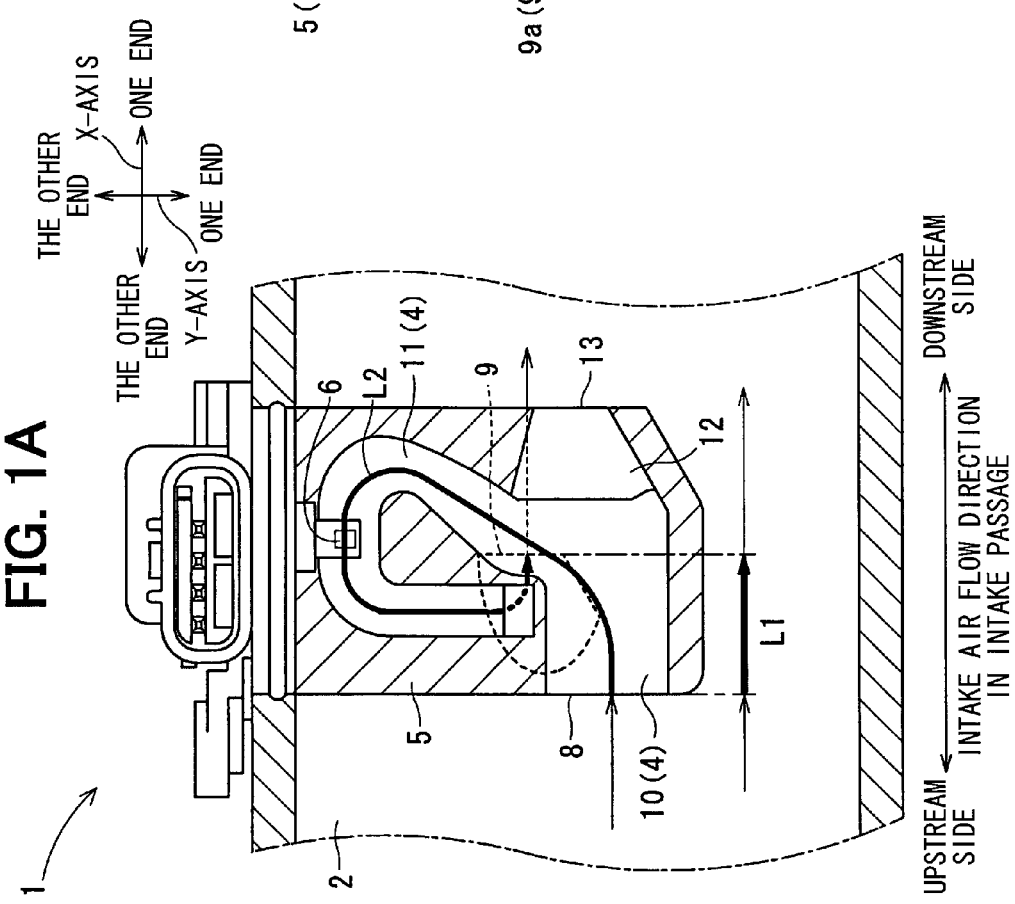

AIR FLOW MEASURING DEVICE HAVING A SENSOR ACCOMMODATED IN A BYPASS FLOW PASSAGE

CROSS REFERENCE TO RELATED APPLICATION

This application is based on Japanese Patent Application No. 2011-157256 filed on Jul. 16, 2011, the disclosure of which is incorporated herein by reference.

TECHNICAL FIELD

The present disclosure relates to an air flow measuring device which measures a flow rate of air.

BACKGROUND

Conventionally, a thermal-type air flow measuring device for measuring an air flow rate by use of heat transfer between the device and air is widely known. The air flow measuring device is disposed in an intake passage leading to an internal combustion engine to be used for measuring the flow rate of intake air suctioned into the engine (flow rate of intake air may be hereinafter referred to as an intake air amount).

More specifically, this air flow measuring device takes in a part of intake air flowing through the intake passage and generates an electrical signal in accordance with the intake air amount. The air flow measuring device includes a housing that defines a bypass flow passage through which the taken-in intake air flows, and a sensor that is accommodated in the bypass flow passage to produce the electrical signal as a result of heat transfer between the sensor and the taken-in intake air. The air flow measuring device reduces the influence of turbulence of a flow of intake air in the intake passage by arranging the sensor in the bypass flow passage instead of disposing the sensor directly in the intake passage, through which intake air passes, so as to output a measurement value with few variations. See, for example, JP-T-2002-506528 (corresponding to U.S. Pat. No. 6,332,356B1), and JP-A-2003-083788 (corresponding to US2003/0046996A1).

Pulsation may be produced in the flow of intake air in the intake passage due to, for example, opening and closing of a valve of the engine. The intake air amount when the pulsation is generated in intake air changes over time, fluctuating between a larger-side peak value of the pulsation and a smaller-side peak value of the pulsation. As a result, due to the thermal-type measuring method whereby the measured value is outputted using the heat transfer relative to air, the electrical signal and the measured value are lower than a central value of the pulsation as a true value, and a negative-side error is thereby produced.

Consequently, in the air flow measuring device, by making longer a passage length L2 of the bypass flow passage than a passage length L1 when air flows straight through the intake passage without flowing through the bypass flow passage, increase ranges of the electrical signal and measurement value in accordance with a value of L2/L1 are set, and the negative-side error of the measurement value is thereby resolved. See, for example, JP-T-2002-506528 and JP-A-2003-083788.

The pulsation of intake air tends to have a large amplitude along with, for example, the recent popularization of exhaust gas recirculation (EGR), and accordingly, a backward flow may be periodically generated. In this case, because the backward flow flows into the bypass flow passage through its outlet, those which generate a negative-side electrical signal as well as a positive-side signal are employed for the sensor. Thus, the sensor can also detect the backward flow together with a forward flow.

However, even though the sensor can detect the backward flow, the negative-side error also increases due to the increase of amplitude of the intake air pulsation. Accordingly, the increase range needs to be set to an even larger value, and L2 needs to be still longer than L1. Nevertheless, since the extension of L2 involves deterioration of a pressure drop in the bypass flow passage, there is a limit on the extension of L2. As a result, measures need to be considered from the other point of view to resolve the negative-side error.

SUMMARY

According to the present disclosure, there is provided an air flow measuring device that is adapted to be disposed in an intake passage through which intake air drawn into an internal combustion engine flows and that is configured to take in a part of intake air flowing through the intake passage and to produce an electrical signal in accordance with a flow rate of intake air. The device includes a housing and a sensor. The housing defines a bypass flow passage through which the taken-in intake air passes and which has an outlet that opens on an outer wall of the housing. The sensor is accommodated in the bypass flow passage to produce the electrical signal as a result of heat transfer between the taken-in intake air and the sensor. The outlet of the bypass flow passage includes a vertical opening and a non-vertical opening. The vertical opening opens toward a downstream side of a flow of intake air in the intake passage and is provided perpendicular to the flow of intake air in the intake passage. The non-vertical opening is provided non-perpendicularly to the flow of intake air in the intake passage. The outlet is a continuous stretch of opening where the vertical opening and the non-vertical opening are continuously formed.

BRIEF DESCRIPTION OF THE DRAWINGS

The above and other objects, features and advantages of the present disclosure will become more apparent from the following detailed description made with reference to the accompanying drawings. In the drawings:

FIG. 1A is a sectional view illustrating inside of an air flow measuring device in accordance with an embodiment;

FIG. 1B is a front view illustrating a main feature of the air flow measuring device of the embodiment;

DETAILED DESCRIPTION

Figure 2A:
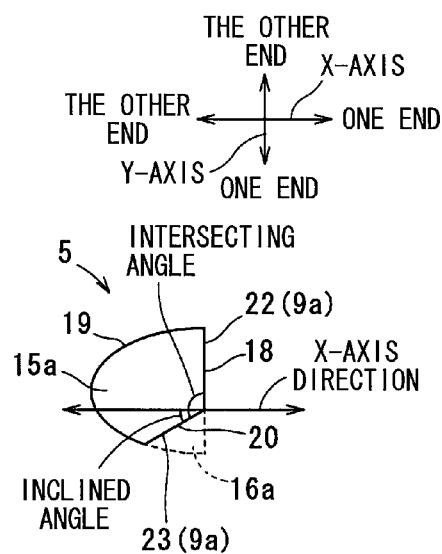
FIG. 2A is a side view illustrating the main feature of the air flow measuring device of the embodiment.
Figure 2B:
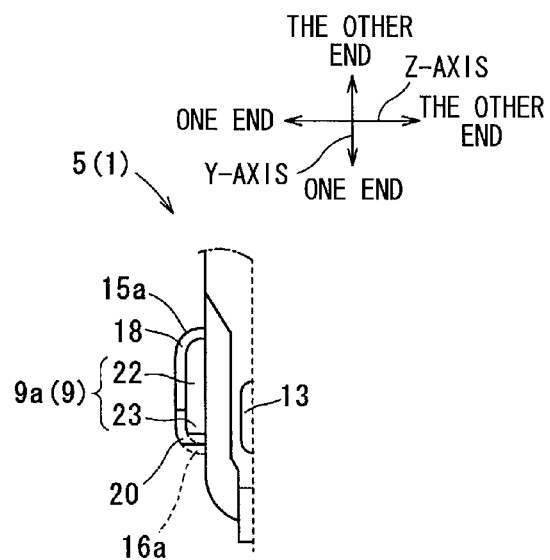
FIG. 2B is a half-front view illustrating the main feature of the air flow measuring device of the embodiment.

An air flow measuring device of an embodiment is adapted to be disposed in an intake passage through which intake air drawn into an internal combustion engine flows. The device is configured to take in a part of intake air flowing through the intake passage and to produce an electrical signal in accordance with a flow rate of intake air. The device includes a housing and a sensor. The housing defines a bypass flow passage through which the taken-in intake air passes and which has an outlet that opens on an outer wall of the housing. The sensor is accommodated in the bypass flow passage to produce the electrical signal as a result of heat transfer between the taken-in intake air and the sensor. The outlet of the bypass flow passage includes a vertical opening and a non-vertical opening. The vertical opening opens toward a downstream side of a flow of intake air in the intake passage and is provided perpendicular to the flow of intake air in the intake passage. The non-vertical opening is provided non-perpendicularly to the flow of intake air in the intake passage. The outlet is a continuous stretch of opening where the vertical opening and the non-vertical opening are continuously formed.

The housing projects from a vicinity of a wall of the intake passage where a flow speed of intake air in the intake passage is small toward a center of the intake passage where the flow speed of intake air is large. The non-vertical opening is formed continuously only with either one of both ends of the vertical opening in a direction in which the housing projects. The non-vertical opening is formed continuously with the vertical opening to intersect with the vertical opening at a slant relative to the vertical opening. The outlet of the bypass flow passage is one of a plurality of outlets. Each of the plurality of outlets includes a continuous stretch of opening where the vertical opening and the non-vertical opening are continuously formed.

Configuration of an air flow measuring device 1 in accordance with the embodiment will be described in reference to FIGS. 1A and 1B. The air flow measuring device 1 measures an air flow rate by means of heat transfer between the device 1 and air. For example, the air flow measuring device 1 is disposed in an intake passage 2 to an internal combustion engine (not shown) and used for measuring a flow rate of intake air suctioned into the engine (intake air amount).

More specifically, the air flow measuring device 1 is disposed in the intake passage 2 and takes in a part of intake air and generates an electrical signal in accordance with the intake air amount. The air flow measuring device 1 includes a housing 5 that defines a bypass flow passage 4 through which the taken-in intake air flows, and a sensor chip 6 that is accommodated in the bypass flow passage 4 to produce the electrical signal as a result of heat transfer between the sensor chip 6 and the taken-in intake air.

The housing 5 projects from the vicinity of a passage wall of the intake passage 2 where flow velocity is small toward the center of the passage 2 where flow velocity is large. A direction in which the housing 5 projects is perpendicular to a flow of intake air in the intake passage 2. The electrical signal generated in the sensor chip 6 is outputted to an electronic control unit (not shown) outside the air flow measuring device 1 through predetermined processing, to be used for, for example, various kinds of control processing such as fuel injection control.

The bypass flow passage 4 includes an inlet 8 for intake air that opens into the intake passage 2 toward an upstream side of the intake air flow, an outlet 9 for intake air that opens into the intake passage 2 toward a downstream side of the intake air flow, a straight passage 10 that extends linearly from the inlet 8 to make the intake air flow straight in the same direction as the intake air flow in the intake passage 2, and a circulation passage 11 that makes flow around the intake air flowing straight through the straight passage 10 to divert the air into the outlet 9. Accordingly, a passage length L2 of the bypass flow passage 4 is longer than a passage length L1 in a case where the air is not taken into the bypass flow passage 4 and flows straight through the intake passage 2.

A dust discharge passage 12 for discharging dust is connected linearly to the straight passage 10. A downstream end of the dust discharge passage 12 serves as a dust discharge port 13 that opens into the intake passage 2 toward a downstream side of the intake air flow. The sensor chip 6 projects at a position that is located on the most rear side of the circulation passage 11 and the farthest from the straight passage 10. The circulation passage 11 branches into two passages on the downstream side, and the two outlets 9 are thereby provided. In addition, at the position of the circulation passage 11 at which the sensor chip 6 is arranged, the flow of air is opposite from the flow in the straight passage 10 and the intake air flow in the intake passage 2.

As described above, the air flow measuring device 1 is not influenced directly by the turbulence of the intake air flow in the intake passage 2 by arranging the sensor chip 6 in the bypass flow passage 4 instead of disposing the sensor chip 6 directly in the intake passage 2, so as to output the measurement value with few variations. By providing the circulation passage 11 and so forth to make the passage length L2 longer than the passage length L1, an increase range of the measurement value in accordance with the numerical value of L2/L1 is set. Consequently, the air flow measuring device 1 resolves measurement value reduction caused by the measurement of a flow rate of the flow having a pulsation.

Characteristics of the air flow measuring device 1 of the embodiment will be described below in reference to FIGS. 1A to 2B. A direction in which intake air flows in the intake passage 2 is referred to as an X-axis direction; a direction in which the housing 5 projects into the intake passage 2 is referred to as a Y-axis direction; and a direction that is perpendicular to both the X-axis direction and the Y-axis direction is referred to as a Z-axis direction. In the X-axis direction, a downstream side is referred to as one end side, and an upstream side is referred to as the other end side. In the Y-axis direction, a central side where flow velocity is large is referred to as one end side, and a passage wall side where the flow velocity is small is referred to as the other end side. Additionally, in the Z-axis direction, when the air flow measuring device 1 is viewed from its front face (when the device 1 is viewed from one end side in the X-axis direction), a left side is referred to as one end side, and a right side is referred to as the other end side.

In the air flow measuring device 1, the two outlets 9 of the bypass flow passage 4 open on an outer wall of the housing 5. The two outlets 9 are provided on one end side and the other end side in the Z-axis direction with the dust discharge port 13 therebetween, so as to be symmetrical in the Z-axis direction (outlets 9 provided on one end side and the other end side in the Z-axis direction may be hereinafter referred to respectively as outlets 9a and 9b).

A portion of the outer wall of the housing 5 that constitutes a downstream area of the bypass flow passage 4 with the outlet 9a being its downstream end is a bulging wall 15a that is swollen on one end side in the Z-axis direction in a shape of a projecting curved surface. A downstream edge of the bulging wall 15a is rimmed with an opening edge of the outlet 9a. Similarly, a portion of the outer wall of the housing 5 that constitutes a downstream area of the bypass flow passage 4 with the outlet 9b being its downstream end is a bulging wall 15b that is swollen on the other end side in the Z-axis direction in a shape of a projecting curved surface. A downstream edge of the bulging wall 15b is rimmed with an opening edge of the outlet 9b. The bulging walls 15a, 15b are provided on one end side and the other end side in the Z-axis direction with the straight passage 10 and the dust discharge passage 12 therebetween so as to be symmetrical in the Z-axis direction.

The bulging walls 15a, 15b are formed in a similar shape to, for example, those walls which are obtained by taking away portions of the following imaginary bulging walls 16a, 16b from the walls 16a, 16b. The imaginary bulging walls 16a, 16b have the following semielliptical projection views respectively when viewed from one end side and the other end side in the Z-axis direction. More specifically, in the projection views of the imaginary bulging walls 16a, 16b, the major axis is parallel to the X-axis direction, and the minor axis is parallel to the Y-axis direction. The projection view is a semiellipse obtained by cutting an ellipse in half along the minor axis, and the minor axis is located on one end side in the X-axis direction.

The bulging walls 15a, 15b correspond respectively to the remainder as a result of removing the portions of the imaginary bulging walls 16a, 16b on one end side in the X-axis direction and on one end side in the Y-axis direction in a shape of a straight line or curved line from a peripheral edge of a minor-axis portion 18 toward a peripheral edge of an elliptic arc portion 19. Accordingly, the peripheral edges of the bulging walls 15a, 15b respectively include the minor-axis portion 18, the elliptic arc portion 19, and a cut-off portion 20. As a result, the outlets 9a, 9b respectively become a continuous opening where a vertical opening 22 and a non-vertical opening 23 are continuous, which will be described below.

The vertical opening 22 is an opening that opens toward a downstream side of the flow of intake air in the intake passage 2 (one end side in the X-axis direction) and is perpendicular to the flow of intake air. The vertical opening 22 is perpendicular to the X-axis direction and parallel to the Y-axis direction. The non-vertical opening 23 is an opening that is provided not perpendicular to the flow of intake air. The non-vertical opening 23 is formed continuously with one end of the vertical opening 22 in the Y-axis direction. The opening 23 is formed continuously with the vertical opening 22 to intersect with the opening 22 at a slant relative to the opening 22. At an intersecting part between the cut-off portion 20 and the minor-axis portion 18, an inclined angle at which the cut-off portion 20 is inclined from the X-axis direction is an acute angle.

Effects of the embodiment will be described. In the air flow measuring device 1 of the embodiment, the outlet 9 of the bypass flow passage 4 opens on the outer wall of the housing 5. The outlet 9 of the bypass flow passage 4 is a continuous opening where the vertical opening 22 that is perpendicular to the flow of intake air in the intake passage 2 and opens toward the downstream side of the intake air flow, and the non-vertical opening 23 that is provided non-perpendicularly to the flow of intake air are continuously formed.

Accordingly, in the case where a backward flow is generated in the intake passage 2 due to the pulsation of intake air, a flow of the backward flow of intake air into the bypass flow passage 4 can be limited. For this reason, pulsation amplitudes of the electrical signal and measurement value are reduced, so that generation of a negative-side error can be limited. Therefore, the generation of the negative-side error can be limited without the increase of a pressure drop in the bypass flow passage 4.

The non-vertical opening 23 is formed continuously with one end of the vertical opening 22 in the Y-axis direction, and the opening 23 is formed continuously with the vertical opening 22 to intersect with the opening 22 at a slant relative to the opening 22. Accordingly, by adjusting an intersecting angle (angle obtained by adding 90 degrees to the inclined angle) that is formed between the vertical opening 22 and the non-vertical opening 23, the amount of inflow of the backward flow can be easily increased or decreased. Thus, the adjustment of the negative-side error can be easily carried out.

The outlet 9 is provided, being divided into the two outlets 9a, 9b, and the continuous opening, where the vertical opening 22 and the non-vertical opening 23 are continuously formed, is provided for each of the outlets 9a, 9b. Consequently, the inhibition of the inflow of the backward flow can be performed at the separated two outlets 9a, 9b. For this reason, the amount of inflow of the backward flow into the bypass flow passage 4 can be averaged with respect to a drift in the intake passage 2. As a result, the accuracy of measurement of the flow rate can be increased.

The mode of the air flow measuring device 1 is not limited to the above-described embodiment, and various modifications may be made to the mode of the device 1. For example, in the air flow measuring device 1 of the embodiment, the bulging walls 15a, 15b correspond to those obtained by eliminating the portions of the imaginary bulging walls 16a, 16b on one end side in the X-axis direction and on one end side in the Y-axis direction from the walls 16a, 16b in the shape of a straight line or curved line from the peripheral edge of the minor-axis portion 18 toward the peripheral edge of the elliptic arc portion 19. Nevertheless, the mode of the bulging walls 15a, 15b is not limited to the above configuration.

Figure 3A:
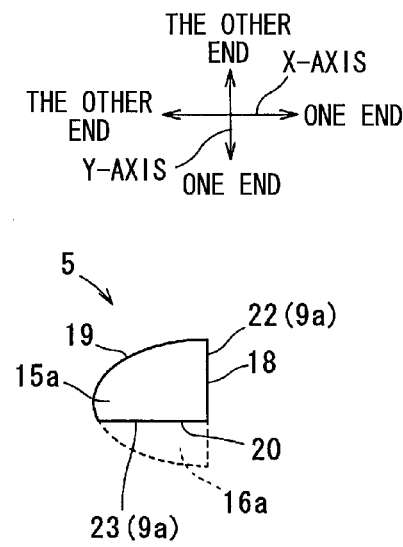
FIG. 3A is a side view illustrating a main feature of an air flow measuring device in accordance with a modification.
Figure 3B:
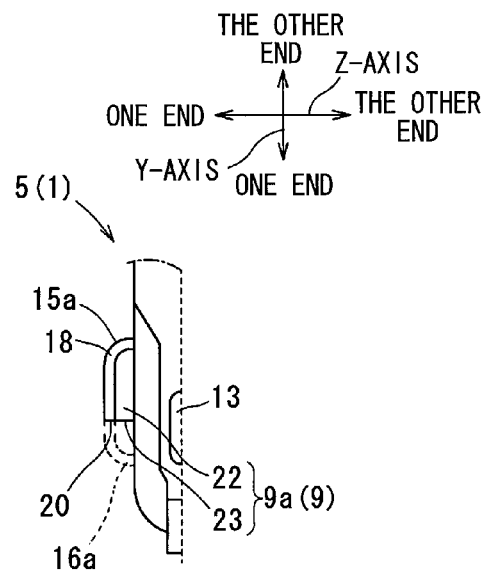
FIG. 3B is a half-front view illustrating the main feature of the air flow measuring device of the modification.

For example, as illustrated in FIGS. 3A and 3B, the bulging walls 15a, 15b may be provided by removing portions of the imaginary bulging walls 16a, 16b on their one end side in the Y-axis direction parallel to the X-axis direction. In this case, at the outlets 9a, 9b, the non-vertical opening 23 is parallel to the X-axis direction and perpendicular to the Y-axis direction; and the opening 23 opens toward one end side in the Y-axis direction. The vertical opening 22 and the non-vertical opening 23 are continuously formed perpendicularly to each other. The inclined angle is 0 degrees, and the intersecting angle is 90 degrees.

Figure 4A:
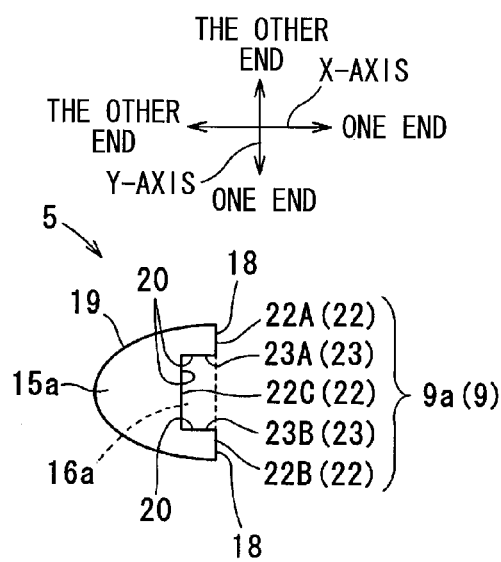
FIG. 4A is a side view illustrating a main feature of an air flow measuring device in accordance with a modification.
Figure 4B:
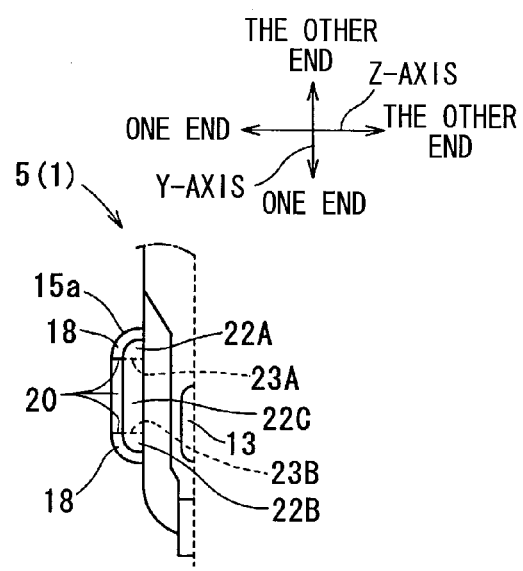
FIG. 4B is a half-front view illustrating the main feature of the air flow measuring device of the modification.

As illustrated in FIGS. 4A and 4B, the bulging walls 15a, 15b may be provided by trimming away a region of the imaginary bulging walls 16a, 16b on one end side in the X-axis direction and on a center side in the Y-axis direction parallel to both directions of the X-axis and Y-axis. In this case, at the outlets 9a, 9b, the non-vertical opening 23 is divided between a portion 23A that is parallel to the X-axis direction and perpendicular to the Y-axis direction, and opens toward one end side in the Y-axis direction, and a portion 23B that is parallel to the X-axis direction and perpendicular to the Y-axis direction, and opens toward the other end side in the Y-axis direction.

The vertical opening 22 is divided into a portion 22A that is formed on the other end side in the Y-axis direction; a portion 22B that is located at the same position as the portion 22A in the X-axis direction and Z-axis direction and formed on one end side in the Y-axis direction; and a portion 22C that is located on the other end side of the portions 22A, 22B in the X-axis direction and formed between the portions 22A, 22B in the Y-axis direction. Accordingly, the portions 22A, 23A, the portions 23A, 22C, the portions 22C, 23B, and the portions 23B, 22B are respectively continuously formed perpendicularly to each other, thereby forming a continuous opening.

Figure 5A:
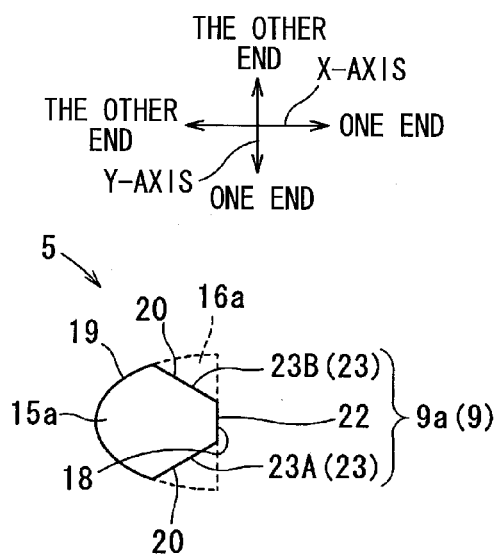
FIG. 5A is a side view illustrating a main feature of an air flow measuring device in accordance with a modification.
Figure 5B:
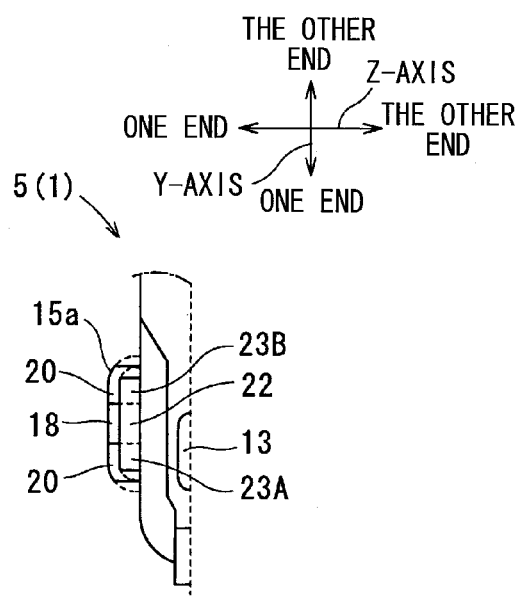
FIG. 5B is a half-front view illustrating the main feature of the air flow measuring device of the modification.

As illustrated in FIGS. 5A and 5B, the bulging walls 15a, 15b may be provided by cutting off both of portions of the imaginary bulging walls 16a, 16b on one end side in the X-axis direction and on one end side in the Y-axis direction, and portions of the walls 16a, 16b on one end side in the X-axis direction and on the other end side in the Y-axis direction, from the walls 16a, 16b in the shape of a straight line or curved line from the peripheral edge of the minor-axis portion 18 toward the peripheral edge of the elliptic arc portion 19. In this case, at the outlets 9a, 9b, the non-vertical opening 23 is divided between a portion 23A that is inclined relative to the X-axis direction on one end side in the Y-axis direction, and a portion 23B that is inclined relative to the X-axis direction on the other end side in the Y-axis direction.

The portion 23A is formed continuously with one end of the vertical opening 22 in the Y-axis direction, and furthermore, the portion 23A continues into the vertical opening 22 to intersect with the opening 22 at a slant relative to the opening 22. The portion 23B is formed continuously with the other end of the vertical opening 22 in the Y-axis direction, and furthermore, the portion 23B continues into the vertical opening 22 to intersect with the opening 22 at a slant relative to the opening 22.

In the air flow measuring device 1 of the embodiment, the imaginary bulging walls 16a, 16b respectively have a semielliptical projection view with their one end side in the X-axis direction being the minor-axis portion 18 when viewed from one end side and the other end side in the Z-axis direction. Nevertheless, the shapes of the imaginary bulging walls 16a, 16b are not limited to such a mode. For example, the projection views when the imaginary bulging walls 16a, 16b are viewed from one end side and the other end side in the Z-axis direction may be those obtained by cutting a shape of an ellipse, circle, or other quadratic curves along the Y-axis direction, or those obtained by cutting a curve other than a quadratic curve along the Y-axis direction. Moreover, the imaginary bulging walls 16a, 16b may be configured to include a shape of a linear peripheral edge in addition to the opening edges of the vertical opening 22 and the non-vertical opening 23.

In the air flow measuring device 1 of the embodiment, the outlet 9 is provided, being divided into the two outlets 9a, 9b. Alternatively, the outlet 9 may be provided, being divided into three or more outlets. In this case, all the separated outlets 9 may respectively include the continuous opening, where the vertical opening 22 and the non-vertical opening 23 are continuously formed.

In addition, in the air flow measuring device 1 of the embodiment, a sensor for detection of the intake air amount is configured as the sensor chip 6. However, instead of the sensor chip 6, the sensor may be configured, for example, using a bobbin obtained by winding a platinum wire.

To sum up, the air flow measuring device 1 of the above embodiment can be described as follows.

An air flow measuring device 1 is adapted to be disposed in an intake passage 2 through which intake air drawn into an internal combustion engine flows. The device 1 is configured to take in a part of intake air flowing through the intake passage 2 and to produce an electrical signal in accordance with a flow rate of intake air. The device 1 includes a housing 5 and a sensor 6. The housing 5 defines a bypass flow passage 4 through which the taken-in intake air passes and which has an outlet 9 that opens on an outer wall of the housing 5. The sensor 6 is accommodated in the bypass flow passage 4 to produce the electrical signal as a result of heat transfer between the taken-in intake air and the sensor 6. The outlet 9 of the bypass flow passage 4 includes a vertical opening 22 and a non-vertical opening 23. The vertical opening 22 opens toward a downstream side of a flow of intake air in the intake passage 2 and is provided perpendicular to the flow of intake air in the intake passage 2. The non-vertical opening 23 is provided non-perpendicularly to the flow of intake air in the intake passage 2. The outlet 9 is a continuous stretch of opening where the vertical opening 22 and the non-vertical opening 23 are continuously formed.

Accordingly, in the case where a backward flow is generated in the intake passage 2 due to the pulsation of intake air, a flow of the backward flow of intake air into the bypass flow passage 4 can be limited. For this reason, pulsation amplitudes of the electrical signal and measurement value are reduced, so that generation of a negative-side error can be limited. Therefore, the generation of the negative-side error can be limited without the increase of a pressure drop in the bypass flow passage 4.

The housing 5 may project from a vicinity of a wall of the intake passage 2 where a flow speed of intake air in the intake passage 2 is small toward a center of the intake passage 2 where the flow speed of intake air is large. The non-vertical opening 23 may be formed continuously only with either one of both ends of the vertical opening 22 in a direction in which the housing 5 projects. The non-vertical opening 23 may be formed continuously with the vertical opening 22 to intersect with the vertical opening 22 at a slant relative to the vertical opening 22. Accordingly, through the adjustment of the intersecting angle between the vertical opening 22 and the non-vertical opening 23, the amount of inflow of the backward flow can be easily increased or decreased. Thus, the adjustment of the negative-side error can be easily carried out.

The outlet 9 of the bypass flow passage 4 may be one of a plurality of outlets 9a, 9b. Each of the plurality of outlets 9a, 9b includes a continuous stretch of opening where the vertical opening 22 and the non-vertical opening 23 are continuously formed. Consequently, the inhibition of the inflow of the backward flow can be performed at the separated more than one outlet 9. For this reason, the amount of inflow of the backward flow into the bypass flow passage 4 can be averaged with respect to a drift in the intake passage 2. As a result, the accuracy of measurement of the flow rate can be increased.

Additional advantages and modifications will readily occur to those skilled in the art. The invention in its broader terms is therefore not limited to the specific details, representative apparatus, and illustrative examples shown and described.

What is claimed is:

1. An air flow measuring device that is adapted to be disposed in an intake passage through which intake air drawn into an internal combustion engine flows and that is configured to take in a part of intake air flowing through the intake passage and to produce an electrical signal in accordance with a flow rate of intake air, the device comprising:
    a housing that defines a bypass flow passage through which the taken-in intake air passes and which has an outlet that opens on an outer wall of the housing; and
    a sensor that is accommodated in the bypass flow passage to produce the electrical signal as a result of heat transfer between the taken-in intake air and the sensor, wherein:
    the outlet of the bypass flow passage includes a vertical opening and a non-vertical opening;
    the vertical opening is provided perpendicular to the flow of intake air in the intake passage and opens toward a downstream side of a flow of intake air in the intake passage;
    the non-vertical opening is provided non-perpendicularly to the flow of intake air in the intake passage; and
    the outlet is a continuous opening where the vertical opening and the non-vertical opening are continuously formed.

2. The air flow measuring device according to claim 1, wherein:
- the housing projects from a vicinity of a wall of the intake passage toward a center of the intake passage;
- the non-vertical opening is formed continuously only with either one of both ends of the vertical opening in a direction in which the housing projects; and
- the non-vertical opening is formed continuously with the vertical opening to intersect with the vertical opening at a slant relative to the vertical opening.

3. The air flow measuring device according to claim 1, wherein:
- the outlet of the bypass flow passage is one of a plurality of outlets; and
- each of the plurality of outlets includes a continuous stretch of opening where the vertical opening and the non-vertical opening are continuously formed.

* * * * *